Aug. 14, 1934.   H. S. COLBY ET AL   1,970,127
HEAT EXCHANGE INSTALLATION
Original Filed Jan. 2, 1930   2 Sheets-Sheet 2
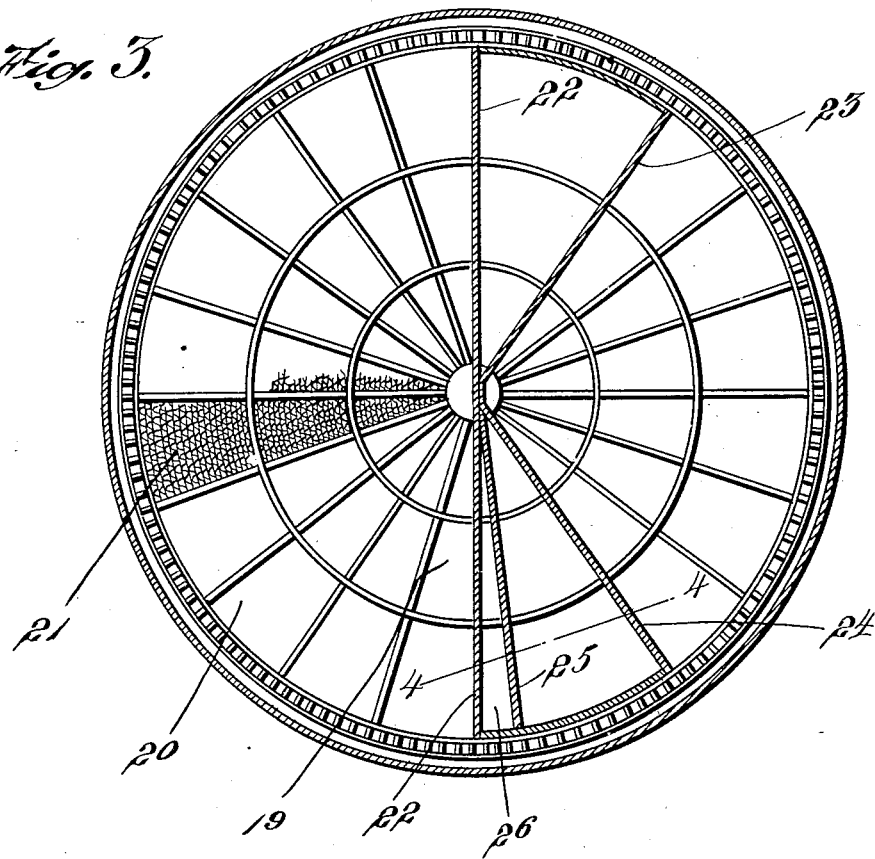
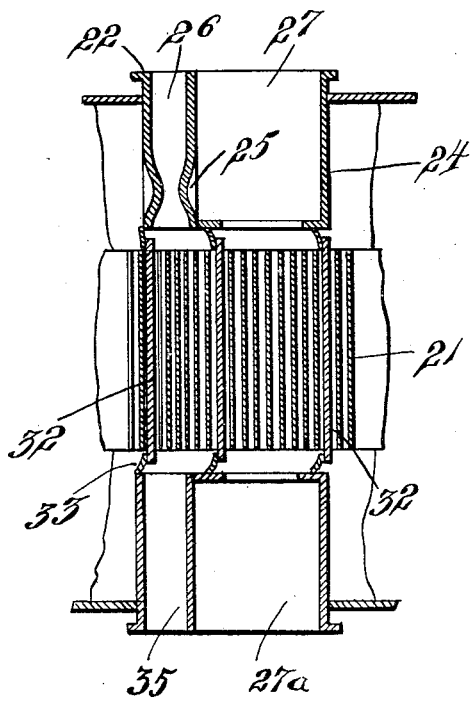
INVENTOR
Haldwell S. Colby
Per Hilmer Karlsson
BY Nathaniel Frucht
their ATTORNEY Patented Aug. 14, 1934

1,970,127

UNITED STATES PATENT OFFICE 1,970,127

HEAT EXCHANGE INSTALLATION

Haldwell S. Colby and Per Hilmer Karlsson, Wellsville, N. Y., assignors to Air Preheater Corporation, Wellsville, N. Y., a corporation of New York Application January 2, 1930, Serial No. 418,029
Renewed September 21, 1931

19 Claims. (Cl. 257—6)

Our present invention relates to heat exchanging installations, and has particular reference to heat exchange systems for hot gases containing excessive amounts of solids impurities.

One object of the invention is to provide a novel arrangement of heat exchanger and gas purifier for purifying impurity laden gases of this character while conserving their heat content.

Another object is to provide an improved heat exchanger having novel scavenging means.

A further object is to provide suitable mechanism for periodically jarring or jolting heat exchanger elements to dislodge solid impurities deposited thereon.

These and other objects and advantageous features will be readily apparent from the detailed description following, in conjunction with the accompanying drawings, and will be particularly pointed out in the appended claims.

In the drawings:

Fig. 3 is a horizontal section through the upper portion of the heat exchanger, showing the scavenging and sealing air passages; and Fig. 4 is a detail vertical section on the line 4—4 of Figure 3.

Figure 1:
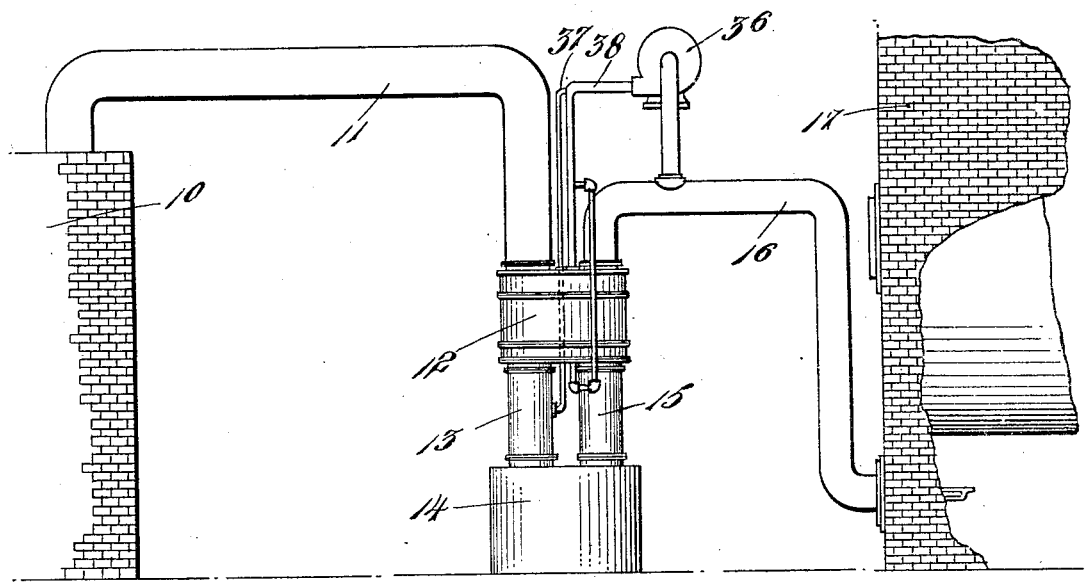
Fig. 1 is a diagrammatic view of a specific form of installation suitable for use with blast furnace gases.

The utilization of blast furnace gases for steam generation involves the problem of removing dust and other solid impurities from the hot gases. These hot gases contain a tremendous quantity of fine dust which is carried in suspension, and have required washing before passage to the boilers in order to prevent deposit of dust and clogging of the pipe lines, gas furnace burners and boiler units. The washing process reduces the amount of dust to a small quantity, in the neighborhood of 1% of the original amount, but the gas on leaving the washer is at maximum saturation and in addition carries some entrained moistures, which is precipitated upon any drop in temperature of the gas. A drop in temperature in passing of the gas to the boilers causes a depositing of some of the remaining dust and the precipitation of moisture in the gas ducts which forms a heavy sludge. This sludge is extremely difficult to remove and considerably increases the cost of operating a blast furnace boiler plant. We have devised a novel arrangement of heat exchanger and gas washer to minimize the sludge deposit, the hot gases being passed through a heat exchanger to reduce their temperature, then to the washer, and then back into the heat exchanger to reabsorb the heat initially transferred. We have also improved the heat exchanger to eliminate transfer of dust or dirty gases to the washed gases passing to the boiler; and the following is a detailed description of one specific arrangement embodying the principles of my invention:

Referring to the drawings, hot gases from the blast furnace 10 pass through the conduit 11 into the hot gas side of a preheater 12, preferably of the rotary regenerative type. The cooled gases then pass through the conduit 13 into a gas washer 14 of any well-known type, and the washed purified gases are returned into the heat exchanger 12 through a conduit 15, and are then led through conduit 16 to the boiler plant 17.

Figure 2:
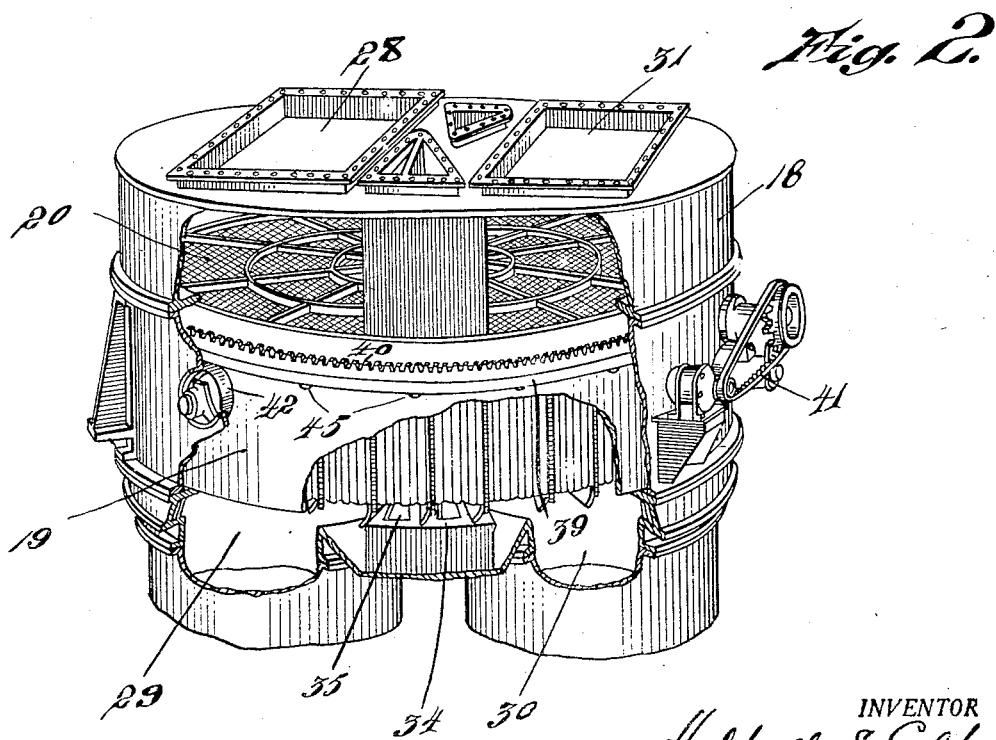
Fig. 2 is a perspective view, partly broken away, of the improved heat exchanger.

The heat exchanger is shown in detail in Figures 2, 3 and 4, and includes an outer casing 18, and a rotor 19 rotatably mounted therein and divided into radial sectors 20 each containing regenerative material 21. The casing is divided into a hot gas section and a washed gas section by a transverse partition 22, and two radial partitions 23, 24, the said partitions defining two radial sectors corresponding in size to the sectors 20 of the rotor 19. The sector between the partitions 22 and 24 is sub-divided by an additional partition 25 into a scavenging sector 26 and a gas sealing sector 27.

A hot gas inlet 28 and outlet 29 permit the hot gases to traverse the hot gas section of the preheater as the regenerative material in the rotor sectors 20 passes to absorb and store heat therefrom, and a washed gas inlet 30 and outlet 31 permit the washed gases to pass through the heated regenerative material to extract the stored heat.

The partitions 32 separating the sectors 20 have sealing strips 33 at both the upper and the lower ends thereof, contacting with a closure member 34 which is in alignment with and of the same size as the sector between partitions 22 and 24. The lower sector member 34 has a port 35 therein leading to the atmosphere or to a low pressure chamber and of a size corresponding to the width of sector 26, the sealing strips 33 of the rotor partitions 32 separating the scavenging and sealing sectors and the hot gas section from the washed gas section during the rotation of the rotor.

A gas blower 36 of the multiple stage type supplies compressed washed gas at high pressure to sector 26 through pipe line 37 and compressed washed gas at a lower pressure to sector 27 through pipe line 38, the pressure of the gas supplied to sector 27 being greater than the pressure of the hot gases which pass through the hot gas portion of the heat exchange.

As shown in Figures 1 and 4, the lower pressure washed gas is supplied to the sealing sector on both sides thereof, in order to maintain the sealing pressure. Such leakage as occurs is to the washed gas passageway, thus conserving the washed gas. The high pressure washed gas preferably passes out through the port 35 to the conduit 13 to join the hot gases for washing and cleaning in the gas washer 14.

The rotor 19 has an annular flange 39 on which an annular gear 40 is mounted, in operative engagement with a pinion (not shown) rotated through operating mechanism 41. The flange 39 is supported on a plurality of spaced rollers 42 suitably mounted in the casing 18, and carries spaced projections 45, preferably formed by bolt heads or the like inserted in the flange, which projections ride on the rollers 42 and thus cause a jarring or a jolting of the rotor to dislodge collected dust.

The hot gases from a blast furnace or furnaces have a temperature in the neighborhood of 300 degrees Fahrenheit; this temperature is reduced in passing through the heat exchanger to about 200 degrees F., the washer causing a further temperature drop to about 65 degrees F.; the lower temperature of the gases entering the washer thus reduce the work of the washer and decrease the percentage of absorbed moisture. The washed gases now pass through the heat exchanger, with a resulting temperature increase to about 150 degrees F., thus conserving a large part of the gas heat and at the same time reducing the moisture content. As the rotor turns, the high pressure scavenging washed gas blows through the regenerative material, removing the dust and dust-laden hot gases therefrom, the constant jarring of the rotor preventing the formation of hard deposits; in addition, the maintenance of a higher pressure between partitions 22 and 24 and above the separating sector member 34 prevents leakage of hot gases across into the washed gas section. If desirable or necessary, a similar higher pressure arrangement may be provided for the separating sector between partitions 22 and 23.

While we have described one specific embodiment of our invention, desired structural changes may be made to meet the needs of particular installations, within the scope of the invention as defined in the appended claims.

We claim:

1. In a heat exchanger, a casing, a rotor therein containing regenerative material, partitions in said casing providing hot gas and cool gas passageways, a separating zone between said passageways, and means for scavenging the regenerative material when traversing said separating zone.

2. In a heat exchanger, a casing, a rotor therein containing regenerative material, partitions in said casing providing hot gas and cool gas passageways, a separating zone between said passageways, and means for maintaining a gas pressure in said zone greater than the pressure of the gases traversing the hot gas passageway.

3. In a heat exchanger, a casing, a rotor therein containing regenerative material, partitions in said casing providing hot gas and cool gas passageways, a separating zone between said passageways, means for scavenging the regenerative material when traversing said separating zone, and means for maintaining a gas pressure in said zone greater than the pressure of the gases traversing the hot gas passageway.

4. In a heat exchanger, a casing, a rotor therein containing regenerative material, partitions in said casing providing hot gas and cool gas passageways, a separating zone between said passageways, and means for periodically jarring said rotor to loosen solid matter deposited on said regenerative material by the hot gas during its passage therethrough.

5. In a heat exchanger, a casing, a rotor therein containing regenerative material, partitions in said casing providing hot gas and cool gas passageways, a separating zone between said passageways, means for periodically jarring said rotor, and means for scavenging the regenerative material when traversing said separating zone.

6. In a heat exchanger, a casing, a rotor therein containing regenerative material, partitions in said casing providing hot gas and cool gas passageways, a separating zone between said passageways, means for periodically jarring said rotor, means for scavenging the regenerative material when traversing said separating zone, and means for maintaining a gas pressure in said zone greater than the pressure of the gases traversing the hot gas passageway.

7. In combination, a source of hot gas, a mass of regenerative material, a gas washer, means for conducting hot gas from said source through said regenerative mass to store heat therein, then through said gas washer, and again through said regenerative mass to reabsorb the stored heat, and means for scavenging said regenerative mass between the periods of passage and repassage of the gas therethrough.

8. In combination, a source of hot gas, a mass of regenerative material, a gas washer, means for conducting hot gas from said source through said regenerative mass to store heat therein, through said gas washer, and again through said regenerative mass to reabsorb the stored heat, and means for flowing washed gas under pressure through said regenerative mass to remove hot gases and dust from said regenerative mass between the periods of passage and repassage of the gas therethrough.

9. In combination, a source of hot gas, a heat exchanger of the rotary regenerative type, partitions in said heat exchanger providing hot gas and cool gas passageways, a separating zone between said passageways, a gas washer, means for conducting hot gas from said source through said hot gas passageway to said gas washer and back through said cool gas passageway, and means for scavenging the regenerative material when traversing said separating zone.

10. In combination, a source of hot gas, a heat exchanger of the rotary regenerative type, partitions in said heat exchanger providing hot gas and cool gas passageways, a separating zone between said passageways, a gas washer, means for conducting hot gas from said source through said hot gas passageway to said gas washer and back through said cool gas passageway, means for scavenging the regenerative material when traversing said separating zone, and means for maintaining a gas pressure in said zone greater than the pressure of the hot gas traversing the hot gas passageway.

11. In combination, a source of hot gas, a heat exchanger of the rotary regenerative type, partitions in said heat exchanger providing hot gas and cool gas passageways, a separating zone between said passageways, a gas washer, means for conducting hot gas from said source through said hot gas passageway to said gas washer and back through said cool gas passageway, means for scavenging the regenerative material when traversing said separating zone, and means for conducting washed gas under pressure to said separating zone to maintain a gas pressure in said zone greater than the pressure of the hot gas traversing the hot gas passageway.

12. In combination, a source of hot gas, a heat exchanger of the rotary regenerative type, partitions in said heat exchanger providing hot gas and cool gas passageways, a separating zone between said passageways, a gas washer, means for conducting hot gas from said source through said hot gas passageway to said gas washer and back through said cool gas passageway, and means for periodically jarring said rotor.

13. In combination, a source of hot gas, a heat exchanger of the rotary regenerative type, partitions in said heat exchanger providing hot gas and cool gas passageways, a separating zone between said passageways, a gas washer, means for conducting hot gas from said source through said hot gas passageway to said gas washer and back through said cool gas passageway, means for periodically jarring said rotor, and means for scavenging the regenerative material when traversing said separating zone.

14. In combination, a source of hot gas, a heat exchanger of the rotary regenerative type, partitions in said heat exchanger providing hot gas and cool gas passageways, a separating zone between said passageways, a gas washer, means for conducting hot gas from said source through said hot gas passageway to said gas washer and back through said cool gas passageway, means for periodically jarring said rotor, means for scavenging the regenerative material when traversing said separating zone, and means for maintaining a gas pressure in said zone greater than the pressure of the gas traversing the hot gas passageway.

15. In a heat exchanger, a casing, a rotor therein containing regenerative material, partitions in said casing forming separation sectors for providing hot gas and cool gas passageways, a partition in one sector dividing said sector into sub-sectors, and means for supplying gas under pressure to said sub-sectors.

16. In a heat exchanger, a casing, a rotor therein containing regenerative material, partitions in said casing forming separation sectors for providing hot gas and cool gas passageways, a partition in one sector dividing said sector into sub-sectors, and means for supplying gas under pressure to one sub-sector and gas under a higher pressure to the other sub-sector.

17. In combination, a source of hot gas, a mass of regenerative material, a gas washer, means for conducting hot gas from said source through said regenerative mass to store heat therein, then through said gas washer, and again through said regenerative mass to reabsorb the stored heat, and means for scavenging said regenerative mass before the repassage of the washed gases through the regenerative mass.

18. In combination, a source of hot gas, a heat exchanger of the rotary regenerative type, partitions in said heat exchanger providing hot gas and cool gas passageways, a gas washer, means for conducting hot gas from said source through said hot gas passageway to said gas washer and back through said cool gas passageway, and means for scavenging the regenerative material prior to passage of the washed gases therethrough.

19. In combination, a source of hot gas, a heat exchanger, a gas washer, a regenerative mass in said heat exchanger having flow passages, means for conducting hot gas from said source to said gas washer, means for conducting washed gas from said gas washer, means for alternately including the flow passages of the regenerative mass in the said conducting means, and means for scavenging said flow passages between said alternate inclusions.

HALDWELL S. COLBY.
PER HILMER KARLSSON.